United States Patent [19]

Sugita et al.

[11] Patent Number: 4,920,572
[45] Date of Patent: Apr. 24, 1990

[54] OBJECT RECOGNITION SYSTEM FOR A ROBOT

[75] Inventors: Kazuhiko Sugita, Anjyo; Shigeo Hotta, Nagoya; Osamu Matsuda; Yoichi Yamakawa, both of Kariya, all of Japan

[73] Assignee: Toyoda Koki Kabushiki Kaisha, Kariya, Japan

[21] Appl. No.: 304,563

[22] Filed: Feb. 1, 1989

[30] Foreign Application Priority Data

Feb. 1, 1988 [JP] Japan .................................. 63-21455

[51] Int. Cl.$^5$ .............................................. G06K 9/20
[52] U.S. Cl. ........................................ 382/48; 382/25; 382/8; 382/53
[58] Field of Search ....................... 382/48, 22, 30, 25, 382/53, 50, 8; 364/513

[56] References Cited

U.S. PATENT DOCUMENTS

| | | | |
|---|---|---|---|
| 4,644,410 | 2/1987 | Schlichtig | 382/52 |
| 4,658,193 | 4/1987 | Low | 364/513 |
| 4,747,148 | 5/1988 | Watanabe et al. | 382/48 |
| 4,803,735 | 2/1989 | Nishida et al. | 382/48 |

Primary Examiner—Leo H. Boudreau
Assistant Examiner—Yon Jung
Attorney, Agent, or Firm—Oblon, Spivak, McClelland, Maier & Neustadt

[57] ABSTRACT

A method and a system for recognizing the location of a cylindrical shaft is provided for use in positioning an end effector of an industrial robot which handles said shaft. In the method and system, a multilevel gray image of the cylindrical shaft which is generated by a change coupled device (CCD) image sensor is first differentiated, and the absolute values of picture elements constituting the differentiated gray image are then binarized on the basis of a threshold value so as to extract an accentuated pattern image which is inherent to the shape of the cylindrical shaft. The accentuated pattern image thus extracted is then collated with a reference accentuated pattern image (template) so as to generate a normal curve signal which has its peak point at a position where the axis of said cylindrical shaft is located. The normal curve data is then binarized on the basis of another predetermined threshold value to generate a single strip image. The center of the single strip image is calculated to determine the location of the cylindrical shaft.

4 Claims, 7 Drawing Sheets

One Scanning Line Data

OBJECT RECOGNITION SYSTEM FOR A ROBOT

BACKGROUND OF THE INVENTION

1. Filed of the invention:

The present invention relates to an object recognition method and a system used together with an industrial robot, of the type wherein the center position of an object with a cylindrical or similar profile carried on a support table is optically detected to enable the robot to reliably grip the object prior to a subsequent transfer operation.

2. Discussion of the Prior Art:

Heretofore, a system has been known wherein a charge coupled device image sensor (hereafter referred to as "CCD image sensor") catches an object to input image data therefor and wherein the gray level of the input image is binarized on the basis of a predetermined threshold value for recognizing the object based on the binarized image data. Another system has also been known which recognizes an object by directly collating the multilevel gray image for an object to be recognized with the multilevel gray image for a model object.

Where the external surface of the object is flat relative to the image sensor, in other words, where the object has a fixed reflection rate larger than the background, then the variation in the image gray level is large at the boundary of the object with the background while the variation in the image gray level within an area occupied by the object is little. Thus, the whole image of the object can be easily extracted by effecting a binarization processing of the image.

However, where an object to be recognized is cylindrical or is similar to a cylindrical shape, the image gray level moderately varies as the scanning of the image moves from the background to the object, and also within an area occupied by the object, the image gray level gradually varies as a curve function with regard to the scanning positions of the object. Thus, in the prior art method wherein such simple binarization processing of the image is carried out, it is difficult to reliably recognize the object and to precisely detect the location thereof.

Moreover, where two objects of the same cylindrical shape lie contacted in parallel relation, the variation in the image gray level is little at the boundary between the two objects. Thus, in this case, the reliable recognition of each object is difficult as well, even utilizing the prior art method involving such simple binarization processing.

In addition, the prior art object recognition method which takes the correlation in gray level between the images of an actual object and a model object in recognizing the actual object gives rise to problems in that too much information on the object to be processed is required, thereby resulting in an elongation of the processing time.

SUMMARY OF THE INVENTION

Accordingly, it is a primary object of the present invention to provide an improved object recognition method and a system therefor used together with industrial robot, capable of reliably recognizing an object of, preferably, a cylindrical shape or similar thereto and of precisely locating the center position of the object with less information for processing and within a shorter time.

Another object of the present invention is to provide an improved object recognition method and a system therefor of the character set forth above which is capable of distinctly recognizing each of plural objects of the same cylindrical shape even where the objects lie contacted in parallel relation with each other on a flat surface.

Briefly, in a method and a system according to the present invention for recognizing the location of an object prior to the gripping thereof by an end effector of an industrial robot, a differentiation circuit and a binarization circuit are provided respectively for differentiating image data which is output from an image sensor catching the object, and for binarizing the differentiated gray level data on the basis of a predetermined threshold value. Reference gray level data for a model object which is created in the same manner as the binarized gray level data is stored in a reference image memory in advance. A collation circuit is further provided for collating the binarized gray level data from the binarization circuit with the reference gray level data. A calculation processor is responsive to output data from the collation circuit to identify or recognize the object and to calculate the location thereof based on the output data.

With this configuration, the gray level which the image of an object to be recognized inherently has because of a particular shape thereof is enhanced or accentuated to be extracted as an accentuated particular pattern image. Thus, even in the case of a cylindrical object to be recognized wherein the variation in gray level at the boundary between the object and the background is small and wherein the gray level also varies within the area occupied by the object, the reliable recognition of the object can be realized. Because the binarization processing is effected for the accentuated particular pattern image, the recognition does not suffer any affection caused by the variation in absolute values of the gray level image depending the change in situation of the surrounding circumstance. Moreover, since the collation between the object and the model thereof is executed using their accentuated pattern images, the quantity of those data required for such collation can be minimized, so that a high speed object recognition can be realized.

BRIEF DESCRIPTION OF THE ACCOMPANYING DRAWINGS

Various other objects, features and many of the attendant advantages of the present invention may be readily appreciated as the same becomes better understood by reference to the following detailed description of the preferred embodiments when considered in connection with the accompanying drawings, wherein like reference numerals designate same or identical parts throughout the several views, and in which.

Figure 1:
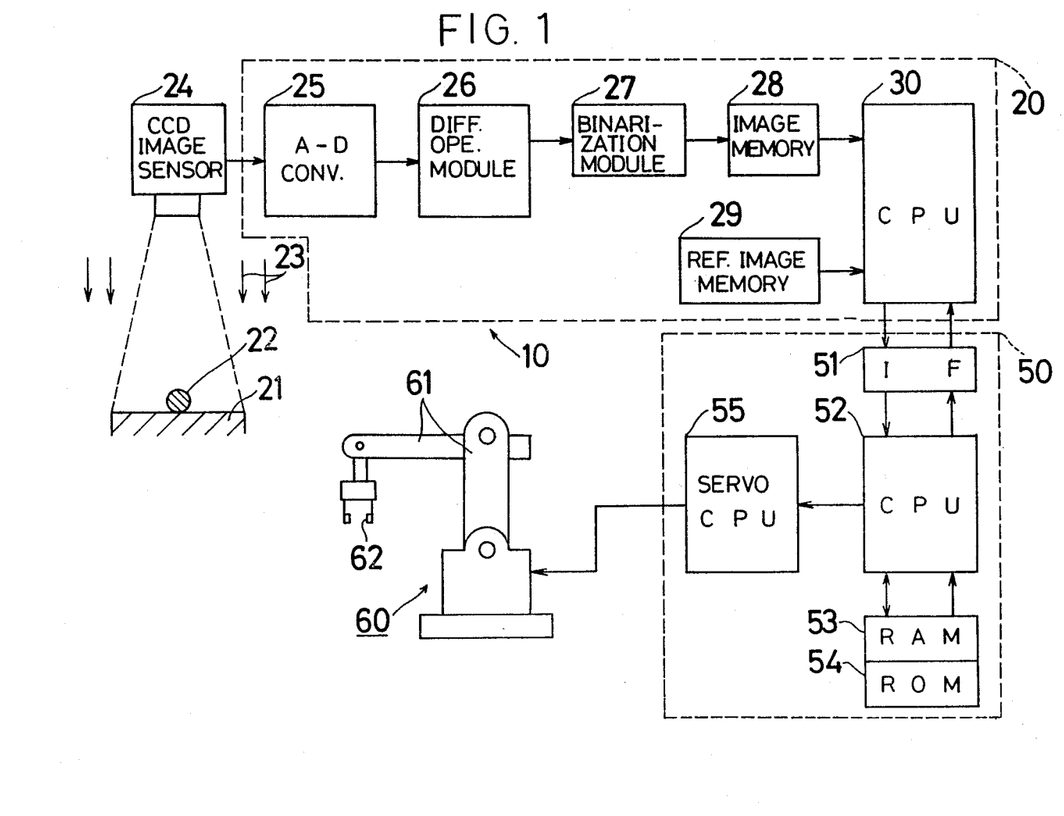
FIG. 1 is a block diagram showing an object recognition system according to the present invention and a robot controller coupled thereto for an industrial robot.

Detailed Description of the Preferred Embodiments
Referring now to the drawings and particularly to FIG. 1 thereof, there is shown in a block diagram the electric circuit configuration of an object recognition system according to the present invention. 10 denotes the object recognition system, which comprises a CCD image sensor 24 for taking up the image of an object 22 to be recognized, and a general-purpose image recognition analyzer 20. The object 22 takes the form of cylindrical shaft in this particular embodiment. However, the object 22 handled in the present invention is not limited to the cylindrical shaft and may be one having a similar or prismatice cross section.

The image recognition analyzer 20 comprises an A-D converter 25 for converting a multilevel image signal from the CCD image sensor 24 into corresponding digital data, a differentiation operation module 26 for differentiating the gray level image data output from the A-D converter 25, a binarization module 27 for binarizing absolute values of the differentiated image data output from the differentiation operation module 26 on the basis of a predetermined threshold value, an image memory 28 for temporarily storing the binarized image data, a reference image memory 29 having stored binarized reference image data in advance which are obtained in the same manner as the binarized image data, i.e., by making binarized data indicative of differentiated image data of a model object on the basis of the predetermined threshold value, and a CPU 30 for collating the binarized image data of the object 22 read out from the image memory 28 with the reference image data, identifying or recognizing the object 22 as a result of such collation and calculating the center position of the object 22.

In order to control an industrial robot 60, there is further provided a robot controller 50, which comprises another CPU 52 coupled to the image recognition analyzer 20 through an interface 51. The CPU 50 is also coupled to a read-only memory (ROM) 54 for storing a robot position control program and so forth, a random access memory (RAM) 53 for storing teaching data, and a servo CPU 55 for driving a number of control axes of the robot 60. The robot 60 is composed of a number of arms generally indicated at 61 and an end effector or gripper hand 62 which is positioned by the arms 61 and which is designed to grip the objects 22 one at a time. The robot controller 50 controls servomotors (not shown) which respectively drive the control axes of the robot 60. On one hand, a fixed base or table 21 carries thereon the objects 22, to which a light source (not shown) downwardly applies parallel beams in the vertical direction. The reflected rays from the cylindrical object 22 enter into the CCD image sensor 24, from which the image signal of the object 22 is output to the A-D converter 25.

The operation of the image recognition analyzer 20 will now be described with reference to FIGS. 1 and 2(a)-2(i).

Figure 2A:
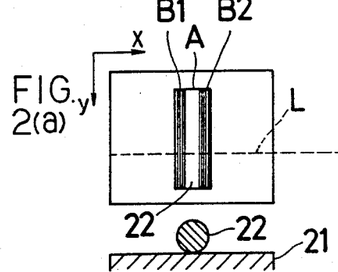
FIGS. 2(a)-2(i) are explanatory views showing the variations of image data and one-scanning line data which flow in the object recognition system.
Figure 2B:
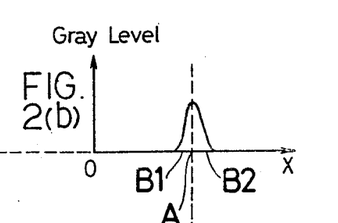

The image sensor 24 and A-D converter 25 catch the object 22 on the fixed base 21 in the form of a gray level image as shown in FIG. 2(a) and 2(b). The gray level of the image represents the diametrical center portion A of the cylindrical object 22 brightly and the diametrically opposite end portions B1 and B2 darkly. More specifically, where a scanning is performed along the line L, the gray level of the image is higher (e.g., brighter) at the diametrical center portion A than at the diametrically opposite end portions B1, B2.

Figure 2C:
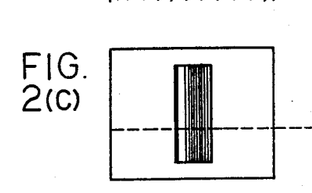
Figure 2D:
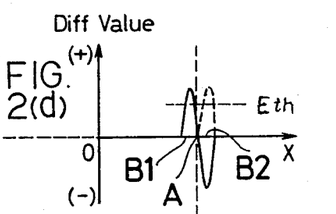

The differentiation operation module 26 then converts the gray level image into the differentiated image shown in FIGS. 2(c) and 2(d). On the differentiated image, the differentiated values at the diametrical center portion A of the object 22 take zero or approximate zero values because of a small variation in the gray level. Conversely, the differentiated values at one side which is behind in the scanning direction X take positive values because the gray level image thereat increases its brightness as the scanning goes, while those at the other side which is ahead in the scanning direction X take negative values because the gray level image thereat decreases its brightness as the scanning goes.

Figure 2E:
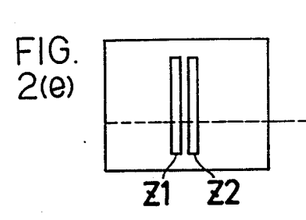
Figure 2F:
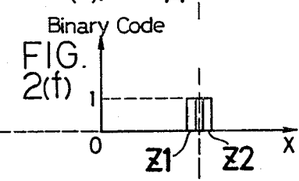

The binarization module 27 then binarizes the absolute values of the gray levels of pexel or picture elements on the differentiated image on the basis of a predetermined threshold value Eth, whereby binarized image data shown in FIGS. 2(e) and (f) is extracted. The binarized image data represents a pair of parallel strip shapes Z1 and Z2 which respectively correspond to the radially opposite end portions B1 and B2 of the cylindrical object 22 over the whole length thereof.

In this manner, the cylindrical object 22 is extracted as an accentuated pattern image which is inherent to the cylindrical shape 22. The accentuated pattern image is temporarily stored in the image memory 28 and thereafter, is read out by the CPU 30 so as to be collated with the binarized reference image data of a model object shown in FIG. 2(i). The reference image data has been created in the same manner as that stored in the image memory 28 and has been stored in the reference image memory 29 in advance. The reference image data defines a reference pattern image, that is to say, a template shown in FIG. 2(i), which is used for a template matching of the same with the accentuated pattern image stored in the image memory 28. Such a template matching can be done by displacing the reference pattern image template) along the scanning line L, whereby a normal curve output having its peak point at a position where the reference pattern image completely overlaps with the extracted pattern image is extracted as the scanning goes. As a result of such collation, the object 22 can be reliably recognized.

Figure 2G:
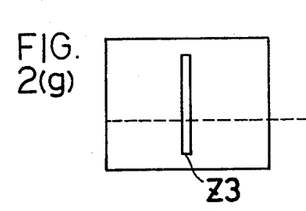
Figure 2H:
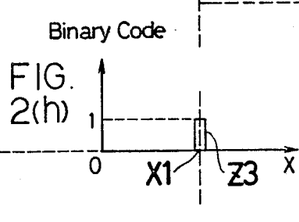
Figure 2I:
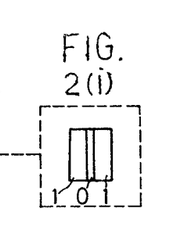

After the collation, the center portion A between the radially opposite end portions B1 and B2 of the object 22 is extracted as a single strip shape Z3 in the manner illustrated in FIGS. 2(g) and 2(h), so as to calculate a diametrical center position Xl of the object 22. This can be done by binarizing the normal curve output data on the basis of another threshold value and then, by calculating the center of the single strip shape Z3.

The center position X1 so calculated is input to the CPU 52 of the robot controller 50 through the interface 51, and the positioning control of the robot 60 is carried out based on the center position X1 so as to enable the end effector 62 to reliably grasp the object 22.

Figure 3:
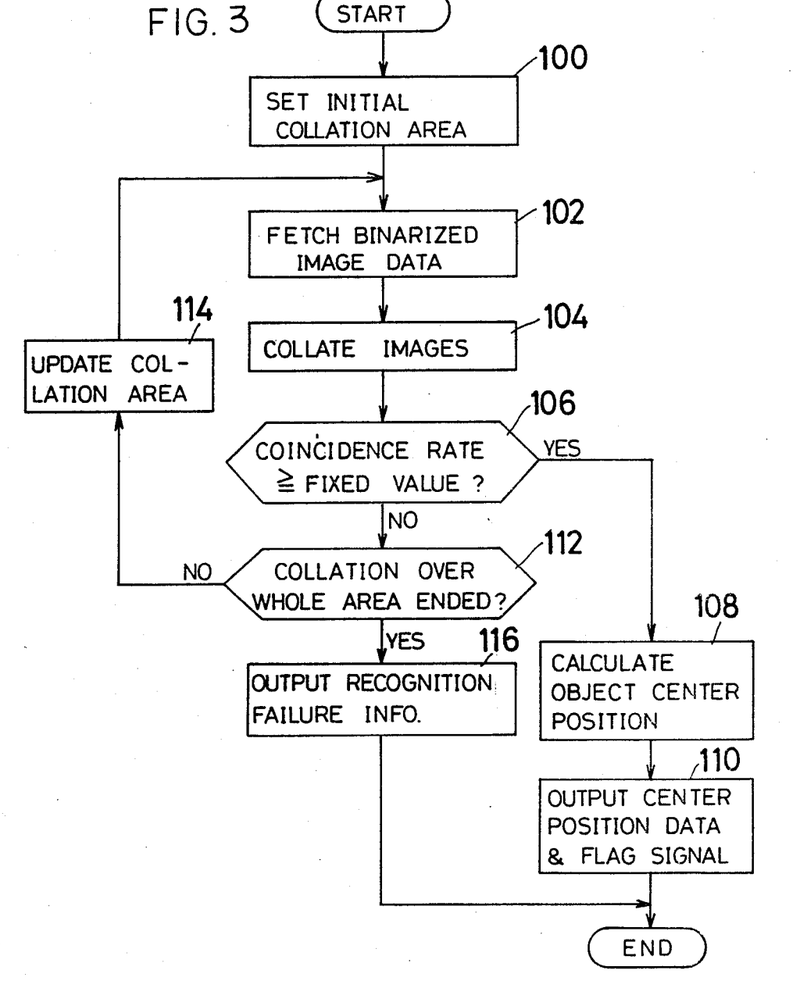
FIG. 3 is a flow chart showing the processings executed by a CPU of the system shown in FIG. 1.

FIG. 3 is a flow chart showing the processing which are executed by the CPU 30 for the aforementioned image collation operation as well as for the subsequent calculation of the center position X1.

First of all, in step 100, predetermined picture element addresses of the binarized image data stored in the image memory 28 are specified as an initial setting for a collation area, and the binarized image data in the specified collation area is fetched in step 102. Step 104 is then reached, wherein the fetched binarized image data shown in FIGS. 2(e) is collated with the binarized reference image data (template) therefor, and step 106 follows to ascertain whether or not the coincidences of the fetched picture elements with those of the template are equal to or more in number than a predetermined percentage. If they are more than the predetermined percentage, there comes to step 108, wherein the diametrical center position A of the object 22 is calculated to be output, along with a collation completion flag signal, to the CPU 52 through the interface 551 in step 110 before the termination of the routine. If the result of the collation does not reach the predetermined percentage, step 112 then follows to ascertain whether or not such collation has been completed over the whole area of the image. If it is not completed yet, on the contrary, then an updation is effected for another collation area before the returning to step 102. The aforementioned steps 102–106, 112 and 114 14 are repetitively executed, so that the completion of the collation over the whole image area is ascertained in step 106. However, when the coincidences are not ascertained over the whole image area, step 116 is then effected to inform the CPU 52 of the failure in the objective recognition before the termination of the routine.

Figure 4:
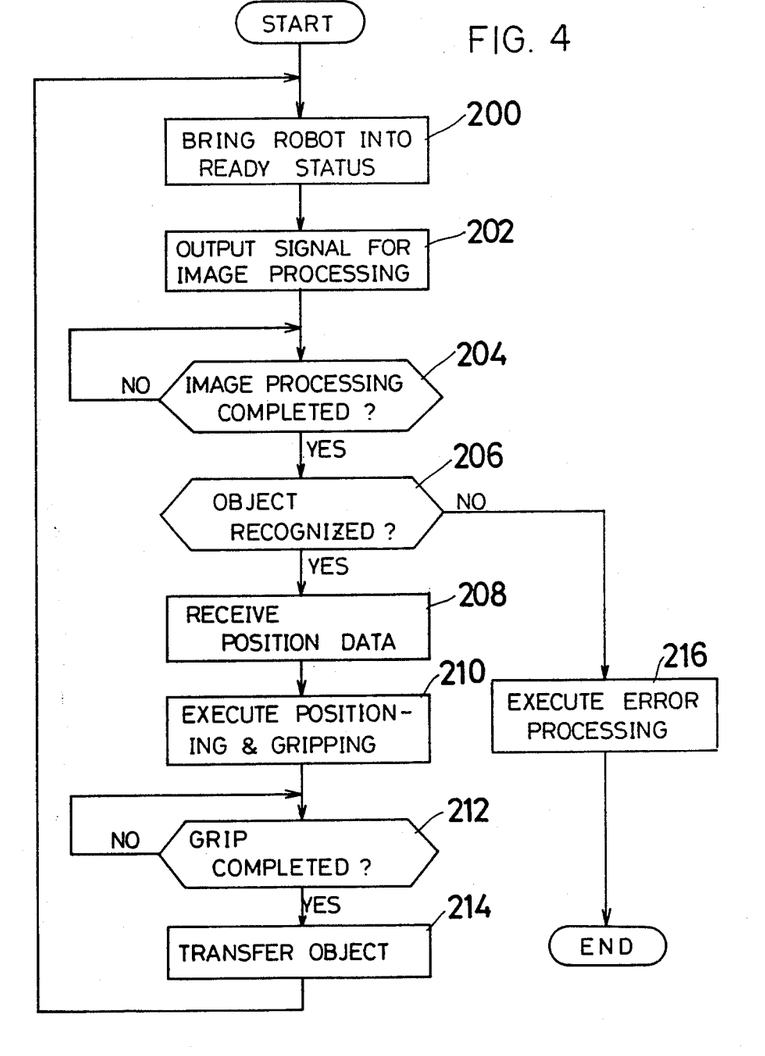
FIG. 4 is a flow chart showing the processings executed by a CPU 52 of the robot controller.

The operation of the robot controller 50 will be described hereafter with reference to the flow chart shown in FIG. 4.

First of all, the CPU 52 brings the robot 60 into a ready status in step 200 and applies an instruction signal for the initiation of an image data processing to the CPU 30 through the interface 51 in step 202. Therefore, in the aforementioned manner, the CPU 30 executes the processings described above with reference to FIG. 3. It is to be noted that the binarized image data stored in the image memory 28 are gathered on a real time basis because the CCD image sensor 24 is always in active.

Step 204 is then reached to ascertain whether or not the image data processing by the CPU 30 has been completed, by checking the aforementioned flag signal and the failure information from the CPU 30. After the waiting until the image data processing is completed, step 206 is then performed to ascertain whether or not the object 22 has been recognized based on the information input from the CPU 30. This ascertainment is made in response to the aforementioned flag signal. Since the diametrical center position data of the object 22 is input from the CPU 30 in step 208 When the object 22 has been recognized, there comes to step 210, wherein the diametrical center position data from the CPU 30 is output to the servo CPU 55 to thereby drive the robot 60, so that the end effector 62 is displaced to the position right over the object 22. An auxiliary function command is also output so as to effect the gripping of the object 22. Thereafter, ascertainment is made in step 212 as to whether or not the gripping of the object 22 has been completed. Upon completion of such gripping, there follows step 214, wherein a transfer operation of the object 22 is carried out by the robot 60. The routine is then returned through step 200 to step 202 to apply to the CPU 30 an instruction to recognize another object 22 to be next gripped and transferred.

In this manner, by the repetition of the aforementioned steps 200–214, objects 22 on the support base or table 21 are transferred one after another.

On the other hand, when the CPU 30 outputs the failure information stating that the recognition of the object 22 has resulted in failure, it is judged in step 206 that the object is impossible to recognize. An error processing for, for example, alarming the operator is executed in step 216 to end the program.

In the illustrated first embodiment, the aforementioned image recognition analyzer 20 is constituted by that known as Model HIDIC-IP/20which is currently commercially available from Hitachi Limited, Japan. However, there may otherwise be employed independent electric circuit components Which perform the same functions as those shown in FIG. 1 and described hereinabove.

A second embodiment of the present invention will be described hereinafter.

Where the absolute values of the differentiated image data are binarized, it may rarely occur that when two cylindrical objects 32a, 32b lie contacted in parallel relation, an error in recognition is involved as if there exists another or third object between the two cylindrical objects 32a and 32b, thereby resulting in the issuance of position detection signals the number of which exceeds that of the actual objects 32a, 32a.

Figure 5A:
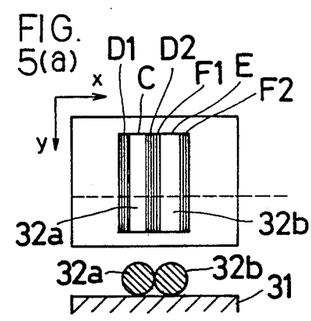
FIGS. 5(a)-5(i) are explanatory views illustrating an object recognition error which may occur where two cylindrical objects lie contacted in parallel relation with each other.
Figure 5B:
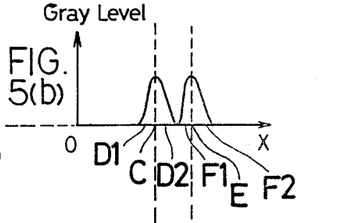
Figure 5C:
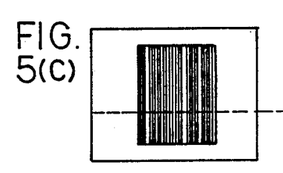
Figures 5D, 5F, 5H, 5I:
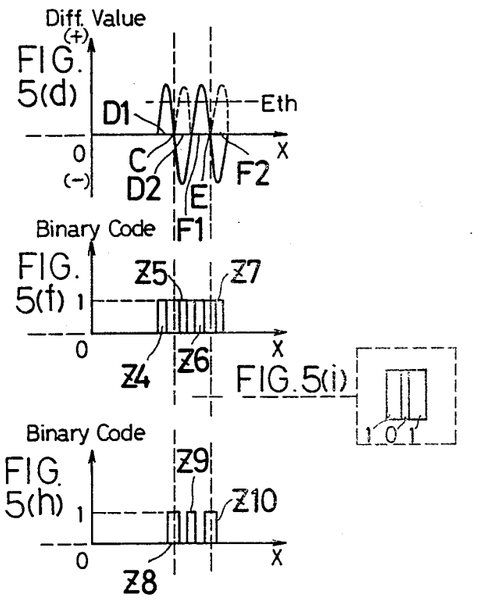
Figure 5E:
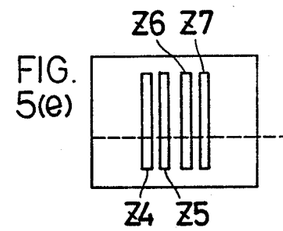
Figure 5G:
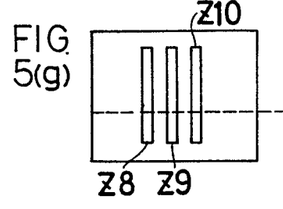

More specifically, the two objects 32a, 32b on the support table 31 are taken up in the form of a gray level image shown in FIGS. 5(a) and 5(b) which respectively correspond to FIGS. 2(a) and 2(b) in the first embodiment, and the differential operation module 26 provides a differentiated image, as shown in FIGS. 5(c), 5(d) which respectively correspond to FIGS. 2(c), 2(d) in the first embodiment. In the same manner as described in connection with FIGS. 2(e) and 2(f), absolute values of the gray levels on picture elements which generates the differentiated image shown in FIGS. 5(c) and 5(d) are binarized on the basis of the predetermined threshold value Eth, whereby there can be obtained binarized image data shown in FIGS. 5(e) and 5(f). When the binarized image data for the objects 32a and 32b is collated with the binarized reference image data (i.e., template) for a model object shown in FIG. 5(i) which corresponds to FIG. 2(i) in the first embodiment, the objects 32 and 32b can be recognized. However, in contradistinction to the case shown in FIGS. 2(g) and 2(h), there are extracted three strips Z9—Z9 which are larger in number than the objects 32a and 32b on the support table 31. That is, in addition to two strips Z8, Z10 which respectively represents the diametrical center portions C, E of the two objects 32a and 32b, another or third strip Z9 is extracted as if is exists between the two objects 32a and 32b. This may disadvantageously directs the robot 60 to perform the gripping of such another non-existing object.

Figure 6:
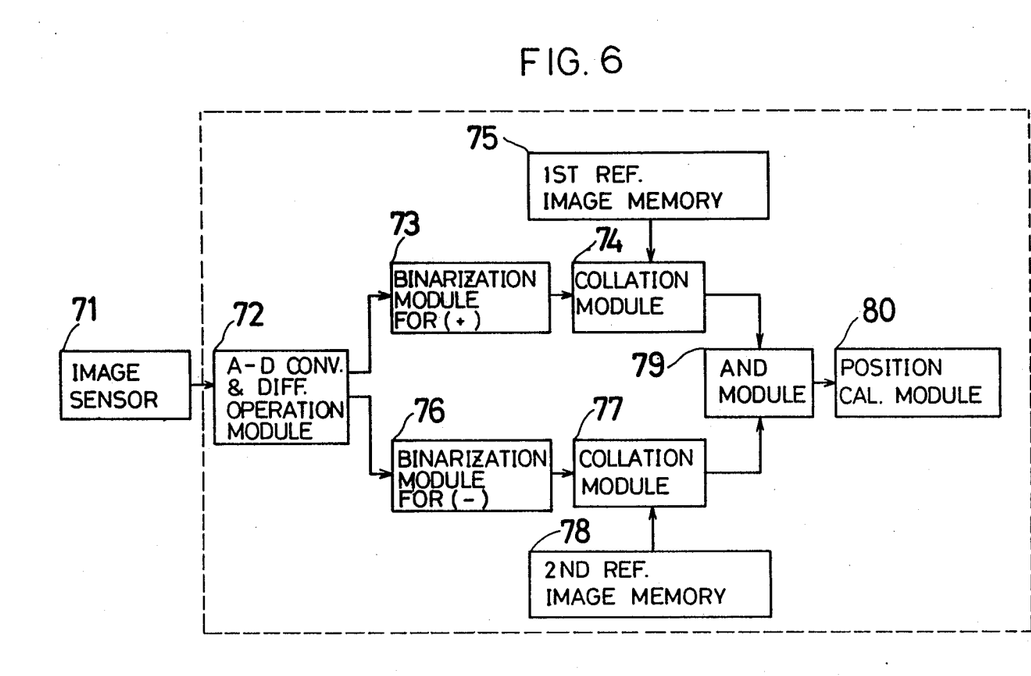
FIG. 6 is a block diagram showing a second embodiment of the object recognition system according to the present invention, wherein components of the system are illustrated in the form to describe an object recognition operation which is performed to obviate such an object recognition error.

To obviate this drawback, the object recognition system 10 according to the present invention is modified to a second embodiment shown in FIG. 6. Taking this configuration, the positive (+) and negative (−) components of the differentiated image data are binarized on the basis of predetermined threshold values Eth and −Eth FIG. 7(c) respectively, and the binarized positive and negative components are respectively collated with first and second reference image data or templates shown in FIGS. 7(g) and 7(h) which have been obtained in advance by binarizing the positive (+) and negative (−) components of the differentiated image data of the model objects which lie contacted in parallel relation. Further, the results of such collations for the positive (+) and negative (−) components are ANDed so that there can be extracted a diametrical center portion of each of the objects 32a and 32b lying contacted in parallel relation.

The operation of the second embodiment will be described hereinafter with reference to FIGS. 6 and 7.

Figures 7A, 7B, 7C:
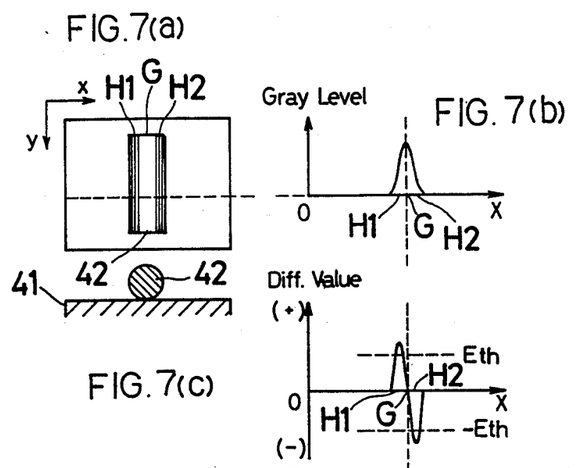
FIGS. 7(a)-7(h) are explanatory views showing the variation of image data and one scanning line data which flow in the system shown in FIG. 6.
Figure 7D:
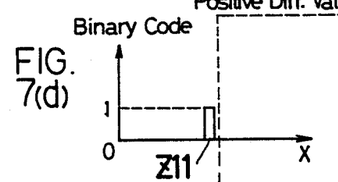
Figure 7E:
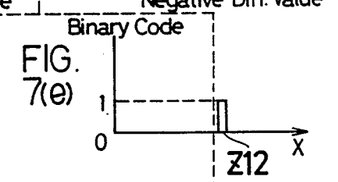

A cylindrical object 42 on a support table 41 is caught by a CCD image sensor 71, from which the shape of the object 42 is output as an gray level image shown in FIGS. 7(a) and 7(b) wherein a single scanning line only is shown for the sake of brevity. An A-D converter and differentiated operation module 72 then converts the gray level image into differentiated image data shown in FIG. 7(c). A binarization module 73 then binarizes the positive (+) component of the differentiated image data on the basis of a threshold value Eth, while another binarization module 76 binarizes the negative (−) component of the differentiated image data on the basis of another threshold value −Eth. Thus, the differentiated image data of the positive (+) component is converted into binarized image data shown in FIG. 7(d), while the differentiated image data of the negative (−) component is converted into binarized image data shown in FIG. 7(e).

Figure 7F:
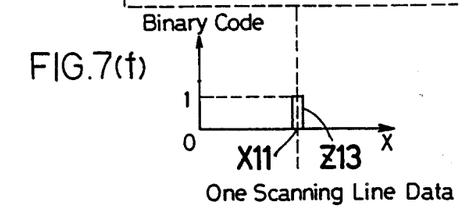
Figure 7G:
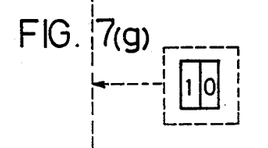
Figure 7H:
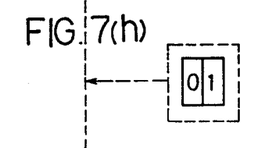

Subsequently, a collation module 74 collates the binarized image data for the positive (+) component with a first reference image data or template shown in FIG. 7(g) by, e.g., displacing the first reference template in the scanning direction X. The reference image template of the positive (+) component for the model object 42 has been stored in a first reference image memory 75 in advance. Likewise, another collation module 77 collates the binarized image data for the negative (−) component with the second reference image data or template shown in FIG. 7(h), which has been stored in a second reference image memory 78 in advance, by displacing the second reference template in the scanning direction X. The outputs from the collation modules 74, 77 indicate approximate normal curves in statistics which have their peak points slightly shifted in the scanning direction (X) in dependence upon the width in the scanning direction, i.e., diameter, of the object 42. Since the image collation for the positive (+) component is performed independently of that for the negative (−) component, it can be realized to distinctively identify the portions of the object 42 which are respectively ahead and behind in the scanning direction. Then, an AND module 79 binarizes the normal curves on the basis of another threshold value (not shown) and ANDs the binarized data with each other. This AND processing makes it possible to recognize the object 42 as that having a single strip Z13 between the diametrical end portions H1 and H2, as shown in FIG. 7(f). A position calculation module 80 then calculates the center position X11 of the single strip Z13 in the scanning direction, whereby the center position X11 of the object 42 in the scanning direction can be precisely detected.

Accordingly, even in the case where two cylindrical objects 32a, 32b lie contacted in parallel relation, as shown in FIG. 5(a), it can be prevented that the strips Z13 (FIG. 7(f)) respectively indicating the center portions C, E of the objects 32a, 32b are detected more in number than the objects 32a, 32b, whereby center position data X11 of the same number as the objects 32a, 32b can be detected, thereby preventing the robot 60 from doing a wrong or unnecessary operation.

The various modules shown in FIGS. 6 are incorporated in the aforementioned general purpose image recognition analyzer known as Model HIDIC-IP/20. However, it may be realized that the same functions as those modules in FIG. 6 can be performed by arranging independent electric circuit components which are commercially available.

Although in the above-described second embodiment, collations with the first and second reference templates are separately performed for the positive and negative components and the results of such collations are ANDed thereafter, such collations may be simultaneously performed for both components by binarizing the positive component of the differentiated image into "1" and "0" and the negative component of the differential image into "0" and "1" and then, by effecting the template matching of the binarized positive and negative components, using a single reference image template having a data pattern "1-0-1".

Further, although in FIG. 6, the binarization modules 73 and 76 are illustrated and described as separate modules for the better understanding of the present invention, they may be a single function module which binarizes the positive and negative component images at different times. The same is true with the set of the collation modules 74 and 77. Similarly, the reference image memories 75 and 78 may be respective storage areas in a single image memory.

Obviously, numerous modifications and variations of the present invention are possible in light of the above teachings. It is therefore to be understood that within the scope of the appended claims, the present invention may be practiced otherwise than as specifically described herein.

What is claimed is:

1. An object recognition system for an industrial robot, comprising:

an image sensor for taking up a gray level image of said object to be handled by said robot;

differentiation means responsive to said gray level image of said object for differentiating said gray level image;

binarization means for binarizing the gray levels of picture elements constituting said gray level image, on the basis of a predetermined threshold value so as to extract an accentuated pattern image inherent to the shape of said object;

reference image storage means for storing an accentuated reference pattern image which is inherent to the shape of a model object;

image collation means for collating said accentuated pattern image extracted by said binarization means with said reference accentuated pattern image stored in said reference image storage means; and position calculation means for calculating the location of said object based on the result of collation obtained by said image collation means;

wherein said object takes the form of a substantially cylindrical object, and wherein said image sensor scans said object in a direction transverse to the axis of said cylindrical object so that said binarization means is able to output said accentuated pattern image wherein two parallel strips appear extending in the axial direction of said cylindrical shaft.

2. An object recognition system as set forth in claim 1, wherein:
said position calculation means is operable for differentiating said result of collation obtained by said collation means, on the basis of another predetermined threshold value so as to extract a single strip which extends in the axial direction of said cylindrical shaft at the center between said two strips extracted by said image binarization means, and for calculating the center position of said single strip so as to locate the position of said cylindrical shaft.

3. An object recognition system for an industrial robot, for recognizing each of plural cylindrical shafts of the same kind which lie contacted in parallel relation with each other, said system comprising:
an image sensor for taking up a gray level image of said cylindrical shafts to be handled by said robot one at a time;
differentiation means responsive to said gray level image of said cylindrical shaft for differentiating said gray level image;
binarization means for binarizing the gray levels of picture elements constituting a positive component of said differentiated gray level image, on the basis of a first predetermined threshold value so as to extract a first accentuated pattern image inherent to the shape of each said cylindrical shaft, and for binarizing the gray levels of picture elements constituting a negative component of said differentiated gray level image, on the basis of a second predetermined threshold value so as to extract a second accentuated pattern image inherent to the shape of each said cylindrical shaft;
reference image storage means for storing first and second accentuated reference pattern images which are inherent to the shape of a cylindrical model object;
image collation means for collating said first accentuated pattern image for said each cylindrical shaft with said first accentuated reference pattern image so as to extract a first output image which indicates the location of a first accentuated image for a portion of each said cylindrical shaft and for collating said second accentuated pattern image for each said cylindrical shaft with said second accentuated reference pattern image so as to extract a second output image which indicates the location of a second accentuated image for another portion of said cylindrical shaft;
image AND means for ANDing said first and second output images from said image collation means with each other so as to extract a single output image which indicates the location of a center portion of each said cylindrical shaft; and
position calculation means for calculating the location of the center portion of each said cylindrical shaft based of said single output image obtained by said image AND means.

4. An object recognition method of recognizing a cylindrical shaft, said method comprising the steps of:
(a) generating a gray level image of said cylindrical shaft;
(b) differentiating the gray levels of picture elements constituting said gray level image;
(c) binarizing said differentiated gray levels of said picture elements on the basis of a predetermined threshold value so as to extract an accentuated pattern image which is inherent to the shape of said cylindrical shaft;
(d) providing a reference accentuated pattern image which is inherent to the shape of a cylindrical model shaft which has same cross section as said cylindrical shaft to be recognized;
(e) collating said accentuated pattern image extracted in step (c) with said reference accentuated pattern image; and
(f) calculating the location of said cylindrical shaft based on the result of a collation executed at step (e);
wherein said collating step (e) generates a normal curve output having its peak point at a position where said reference accentuated pattern image completely overlaps with said accentuated pattern image, and wherein said calculating step (f) includes:
binarizing said normal curve output on the basis of another predetermined threshold value so as to extract a single strip image which indicates the center portion of said cylindrical shaft; and
calculating the center position of said single strip image so as to determine the location of said cylindrical shaft.

* * * * *